(12) United States Patent
Wang et al.

(10) Patent No.: US 7,808,583 B2
(45) Date of Patent: Oct. 5, 2010

(54) POLARIZING SHEET CAPABLE OF COLOR CONVERSION AND LIQUID CRYSTAL DISPLAY EQUIPPED WITH THE POLARIZING SHEET

(75) Inventors: Chih-Yuan Wang, Taichung County (TW); Hui-Yu Chang, Changhua County (TW); Mei-Ju Huang, Changhua County (TW)

(73) Assignee: Wintek Corporation, Taichung (TW)

( * ) Notice: Subject to any disclaimer, the term of this patent is extended or adjusted under 35 U.S.C. 154(b) by 527 days.

(21) Appl. No.: 11/797,244

(22) Filed: May 2, 2007

(65) Prior Publication Data

US 2007/0291196 A1 Dec. 20, 2007

(30) Foreign Application Priority Data

Jun. 12, 2006 (TW) .............................. 95120866 A (51) Int. Cl.
G02F 1/1335 (2006.01)

(52) U.S. Cl. ........................................... 349/96; 349/61

(58) Field of Classification Search .................... 349/96, 349/61
See application file for complete search history.

(56) References Cited

U.S. PATENT DOCUMENTS

| 5,920,367 | A * | 7/1999 | Kajimoto et al. | 349/162 |
| 2005/0280755 | A1* | 12/2005 | Nishida et al. | 349/107 |
| 2007/0047254 | A1* | 3/2007 | Schardt et al. | 362/607 |
| 2008/0111960 | A1* | 5/2008 | Yoshida et al. | 349/117 |
| 2009/0040454 | A1* | 2/2009 | Ichihashi et al. | 349/193 |

* cited by examiner

*Primary Examiner*—K. Cyrus Kianni
(74) *Attorney, Agent, or Firm*—Muncy, Geissler, Olds & Lowe, PLLC (57) ABSTRACT

The present invention provides a liquid crystal display with a polarizing sheet capable of color conversion. The liquid crystal display includes an upper polarizing sheet and a lower polarizing sheet, in one of which is provided with a conversion layer to absorb predetermined spectrum distribution energy of the light provided by the backlight module and to convert it to white light spectrum distribution.

15 Claims, 7 Drawing Sheets

POLARIZING SHEET CAPABLE OF COLOR CONVERSION AND LIQUID CRYSTAL DISPLAY EQUIPPED WITH THE POLARIZING SHEET

BACKGROUND OF THE INVENTION

1. Field of the Invention

The present invention relates generally a liquid crystal display (LCD) module, and more particularly to a polarizing sheet with function of color conversion and a LCD equipped with the polarizing sheet.

2. Description of the Related Art

Figure 1:
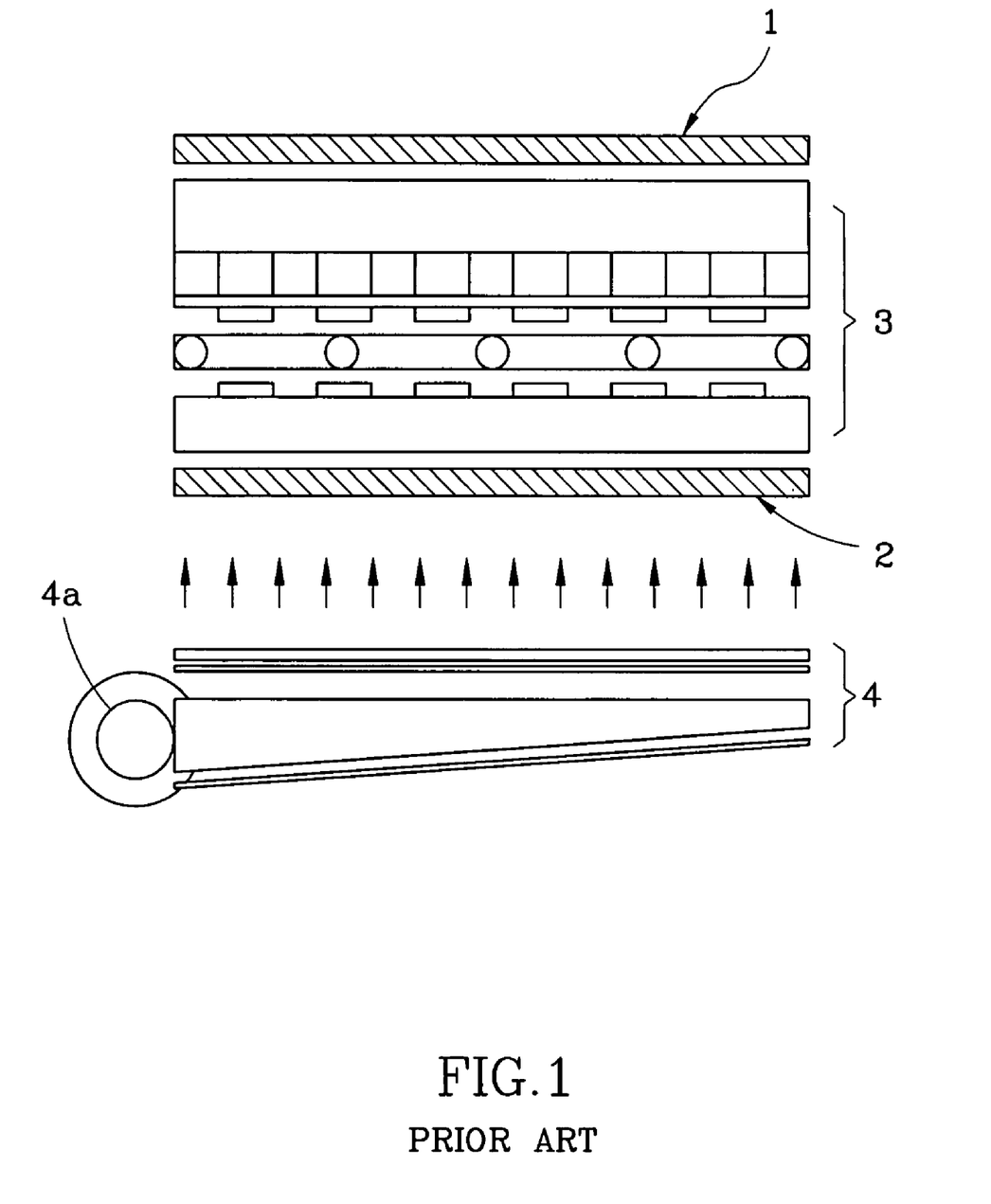
FIG. 1 is a sectional view of the conventional LCD.

FIG. 1 shows a conventional liquid crystal display (LCD), which includes an upper polarizing sheet 1, a lower polarizing sheet 2, a liquid crystal panel 3 between the upper and lower polarizing sheets 1 and 2, and a backlight module 4 under the lower polarizing sheet 2 to provide the liquid crystal panel 3 light. The light of backlight module 4 travels through the lower polarizing sheet 2 first, and convert to polarizing light. The liquid crystal panel 3 is controlled to twist liquid crystal molecules that controls the polarizing light traveling to the upper polarizing sheet 1 or not to show predetermined images.

The backlight module 4 is preferred to provide white light for color LCD, and the color of light is determined by the light source 4a of the backlight module 4. The common light source 4a for providing white light is light emitting diode (LED), however, the white light LED is expensive that increase the cost of LCD. To overcome the above drawback, some LCDs provide blue light LED and an optical film to convert blue light to white light. Although the blue light LED is cheaper than the white light LED, but the optical film increases the thickness of the back light module and the cost.

SUMMARY OF THE INVENTION

The primary objective of the present invention is to provide a polarizing sheet with function of color conversion and a LCD equipped with the polarizing sheet, which has lower cost of fabrication.

According to the objective of the present invention, a LCD equipped with a polarizing sheet capable of color conversion includes an upper polarizing sheet, a lower polarizing sheet, a liquid crystal panel between the upper polarizing sheet and the lower polarizing sheet and a backlight module for providing light to the liquid crystal panel. The upper polarizing sheet or the lower polarizing sheet is provided with a conversion layer to absorb predetermined spectrum distribution energy of the light provided by the backlight module and to convert it to white light spectrum distribution.

DETAILED DESCRIPTION OF THE INVENTION

Figure 2:
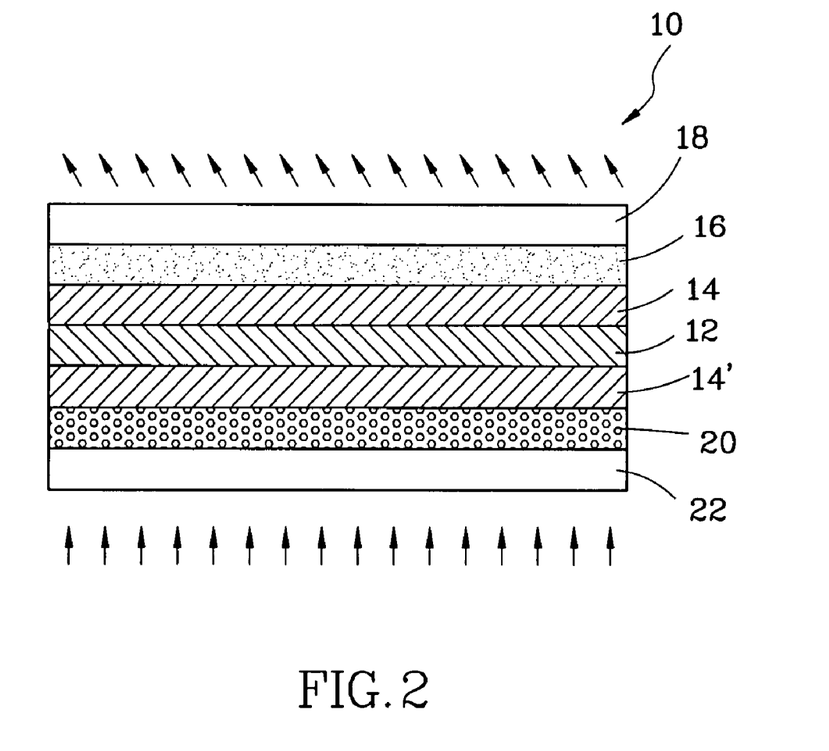
FIG. 2 is a sectional view of the polarizing sheet of a first preferred embodiment of the present invention.
Figure 3:
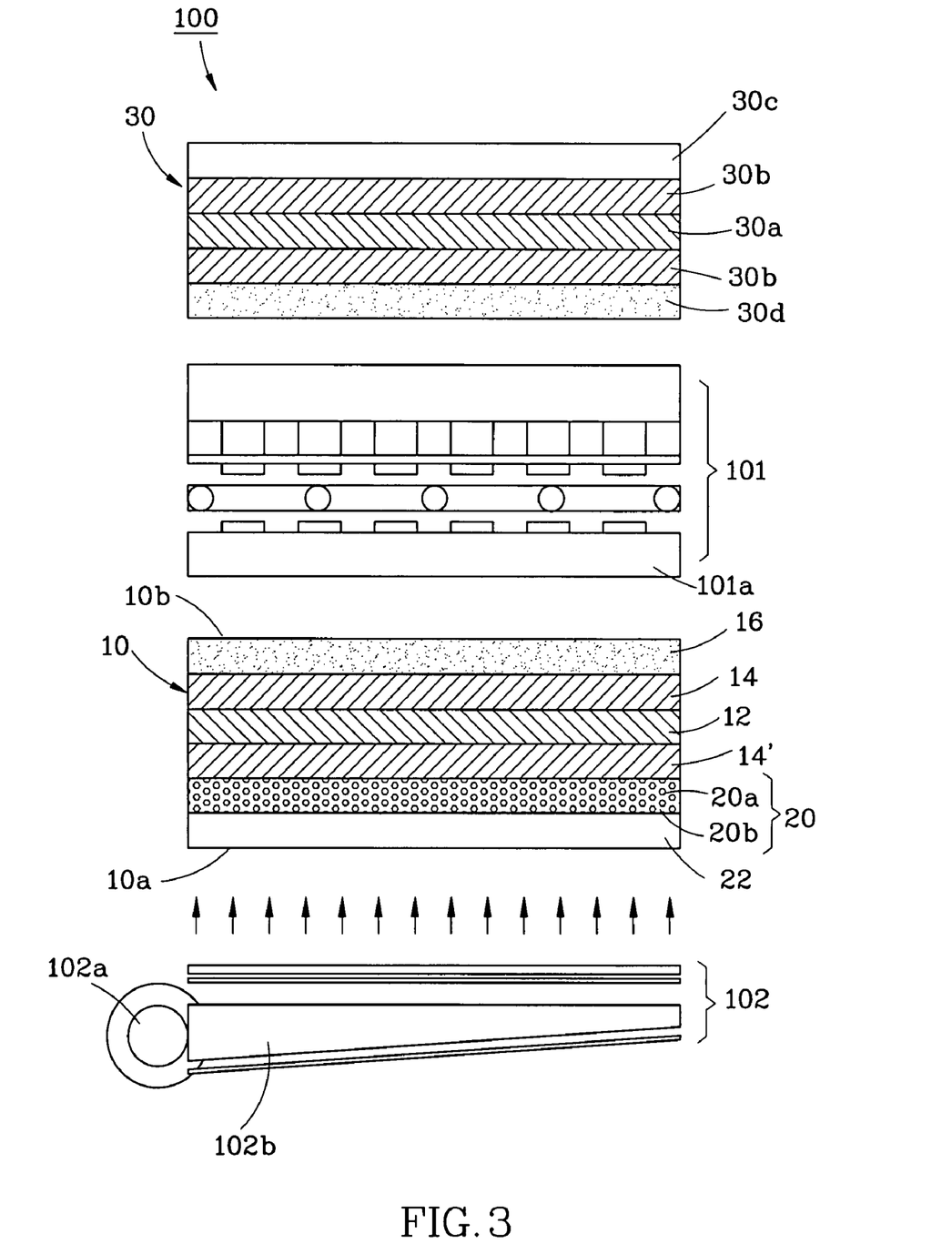
FIG. 3 is a sectional view of a LCD equipped with the polarizing sheet of the first preferred embodiment of the present invention.

FIG. 2 shows a polarizing sheet 10 of the first preferred embodiment of the present invention, and FIG. 3 shows a liquid crystal display (LCD) 100 equipped with the polarizing sheet 10 between a liquid crystal panel 101 and a backlight module 102. In the embodiment of the present invention, a blue light LED 102a is provided instead of white light LED.

The polarizing sheet 10 has a light enter side 10a (first side) facing the backlight module 102 and a light output side 10b (second side) facing the liquid crystal panel 101. The combination of the polarizing sheet 10 includes a polarizing base member 12, two protective layers 14, 14', a pressure sensitive adhesive (PSA) 16, a release film 18, a conversion layer 20 and a surface protective layer 22.

The polarizing base member 12 is a film with well transparent property to convert natural light to polarizing light. The polarizing base member 12 usually is made of polyvinyl alcohol (PVA).

The protective layers 14, 14' are on opposite sides of the polarizing base member 12 to support and protect the polarizing base member 12. The protective layers 14, 14' usually are made of triacetate cellulose film (TAC film).

The PSA 16 is provided on the protective layer 14 without contacting with the polarizing base member 12. The PSA 16 usually is made of ethylene vinyl acetate (EVA).

The release film 18 is attached on the PSA 16 to bar dust or particles from the PSA 16. The release film 18 usually is made of polyethylene terephthalate (PET). As shown in FIG. 3, after the release film 18 is peeled off, the exposed side of the PSA 16 is the light output side 10b of the polarizing sheet 10, and the polarizing sheet 10 may attach the PSA 16 on a lower substrate 101a of the liquid crystal panel 101.

The conversion layer 20 is formed on the protective layer 14' without contacting with the polarizing base member 12. The conversion layer 20 is made of conversion material 20a, which may absorb spectrum distribution energy energy, mixed with binder 20b. In the present embodiment, because of the blue light LED 102a, the conversion material 20a is chosen from a material that may absorb blue light spectrum distribution energy energy, such as yttrium aluminum garnet (YAG), terbium aluminum garnet (TAG), sulfide, oxide, halide, borate, borate mixed with fewer metal, halide mixed with fewer metal, YAG mixed with fewer metal, TAG mixed with fewer metal, sulfide mixed with fewer metal, oxide mixed with fewer metal, halide mixed with fewer metal or phosphate mixed with fewer metal, which are inorganic light emitting materials. It is noted that pigment or dies, which are organic light emitting materials, may be added in the conversion material 20a to increase or correct optical color light spectrum distribution. Diameters of particles of the conversion material 20a are less than 1 μm that benefit the transparent property.

The surface protective layer 22 is formed on the conversion layer 20 without contacting with the protective layer 14' to protect the conversion layer 20. The side of the surface protective layer 22 opposite to the backlight module 102 is the light enter side 10a of the polarizing sheet 10. The surface protective layer 22 usually is made of polyethylene (PE) or polyethylene terephthalate (PET).

The polarizing is mounted between the liquid crystal panel 101 and the backlight module 102. When the blue light LED 102a provides blue light into a light guide plate 102b of the backlight module 102, and then travels to the polarizing sheet 10, the conversion material 20a of the conversion layer 20 absorbs spectrum distribution energy of the blue light and convert the blue light to white light, such that the light traveling through the polarizing base member 12 is the polarizing with white light spectrum distribution energy.

The polarizing sheet 10 of the present embodiment may achieve color conversion function, such that another polarizing sheet 30 above the liquid crystal panel 101, as shown in FIG. 3, may have no conversion layer. In other words, the polarizing sheet 30 is a conventional polarizing sheet including polarizing base member 30a, two protective layers 30b, a surface protective layer 30c and a PSA 30d.

In conclusion, the color conversion technique of the present invention provides the conversion layer 20 in a conventional polarizing sheet. It has polarizing function and color conversion function as well. The polarizing sheet 10 of the present invention may be used with the cheaper blue light LED 102a that may decrease the cost. The present invention has no extra optical film that may reduce the thickness of the backlight module 102.

In the first embodiment of the present invention, the backlight module 102 is provided with the blue light LED 102a in accordant with the conversion material 20a absorbing visible light spectrum distribution energy. On the contrary, when the backlight module is provided with cold cathode fluorescent lamp (CCFL) of UV type LED, which provide UV light with short wavelength, to increase the light efficiency, the conversion material of the conversion layer should be made of a material chosen from sulfide, oxide, halide, phosphate, borate, borate mixed with fewer metal, YAG mixed with fewer metal, TAG mixed with fewer metal, sulfide mixed with fewer metal, oxide mixed with fewer metal, halide mixed with fewer metal or phosphate mixed with fewer metal, which are inorganic light emitting materials. Pigment or dies, which are organic light emitting materials, may be added in the conversion material.

FIGS. 4 to 7 show some alternate structures of the polarizing sheet between the liquid crystal panel 101 and the backlight module 102. These polarizing sheets mainly include a polarizing base member 12 for polarization and a conversion layer for absorbing spectrum distribution energy energy. The rest constitutions are similar to above described structure. The following description only briefly describes the different parts.

Figure 4:
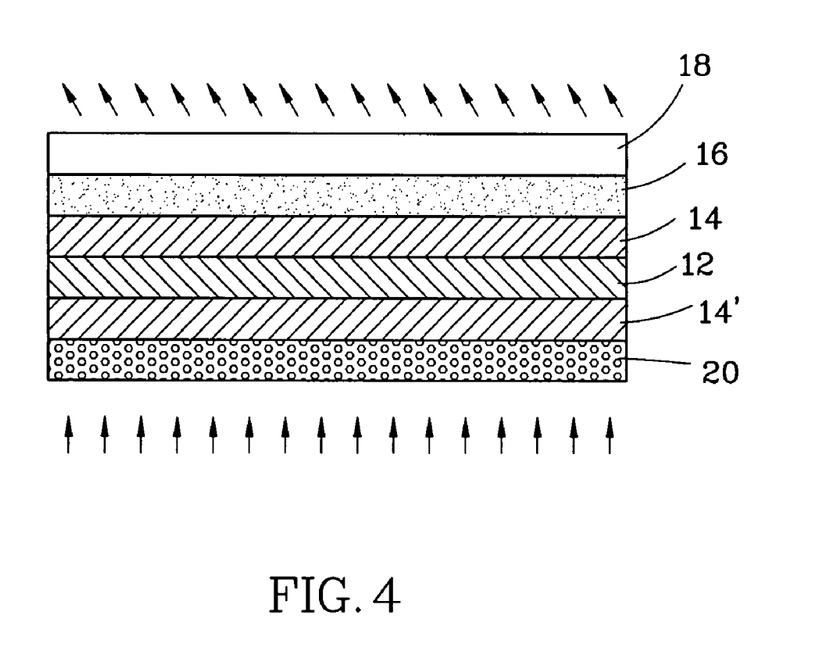
FIG. 4 is similar to FIG. 2 but without the surface protective layer.

FIG. 4 shows the polarizing sheet without the surface protective layer, and the conversion layer has both functions of color conversion and surface protection.

Figure 5:
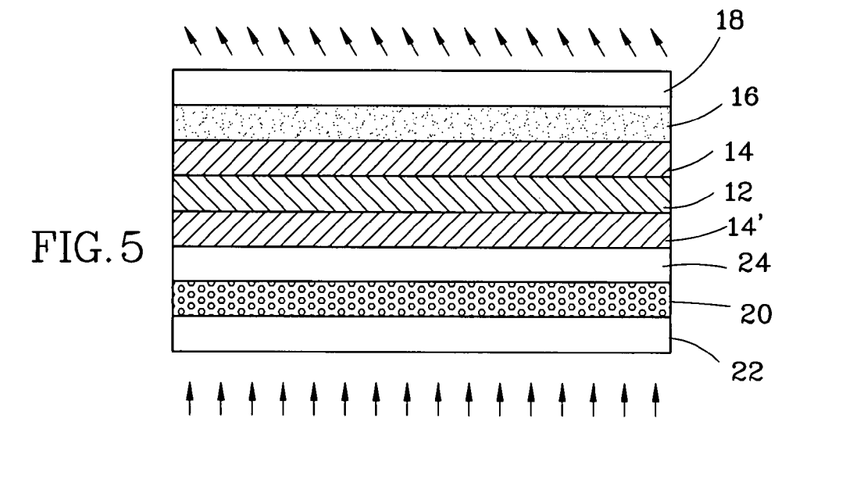
FIG. 5 is similar to FIG. 2, showing the barrier layer between the protective layer and the conversion layer.

FIG. 5 shows the polarizing sheet with a barrier layer 24 between the protective layer 14' and the conversion layer 20. The function of the barrier layer 24 is preventing the polarizing base member 12 from damage when making the conversion layer 20.

Figure 6:
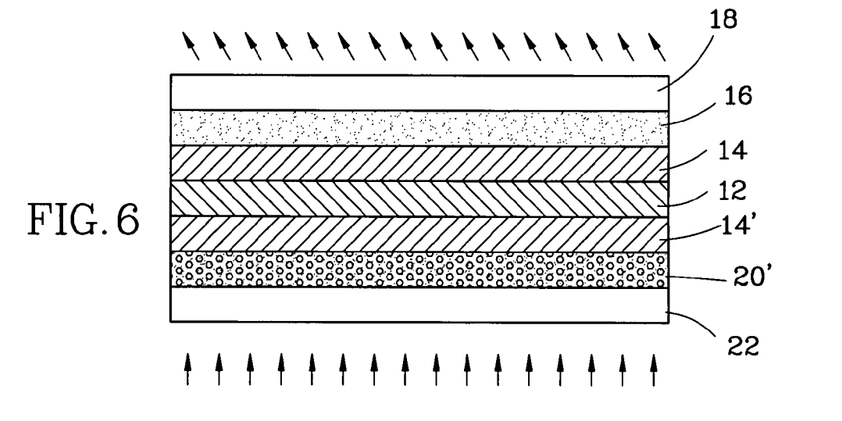
FIG. 6 is similar to FIG. 2, showing adding PSA in the conversion layer.

FIG. 6 shows the polarizing sheet with a conversion layer 20', which further includes PSA therein.

Figure 7:
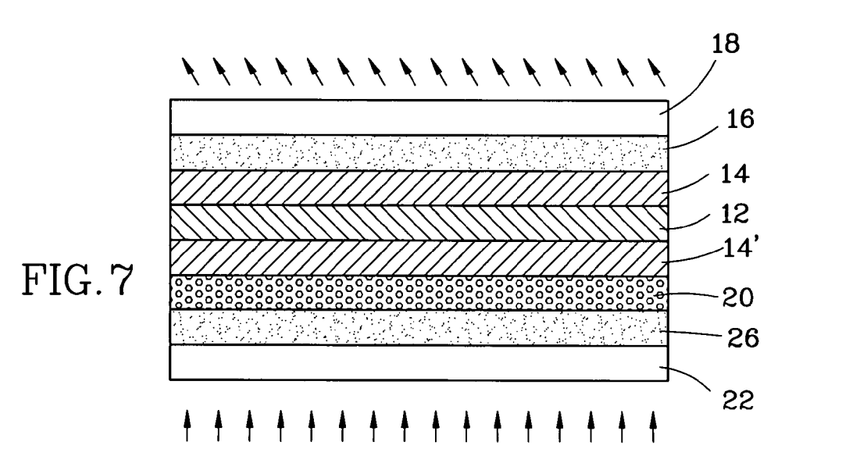
FIG. 7 is similar to FIG. 2, showing PSA between the surface protective layer and the conversion layer.

FIG. 7 shows the polarizing sheet with a PSA 26 between conversion layer 20 and the surface protective layer 22.

The description above is a few preferred embodiments of the present invention and the equivalence of the present invention is still in the scope of the claim of the present invention.

Figure 8:
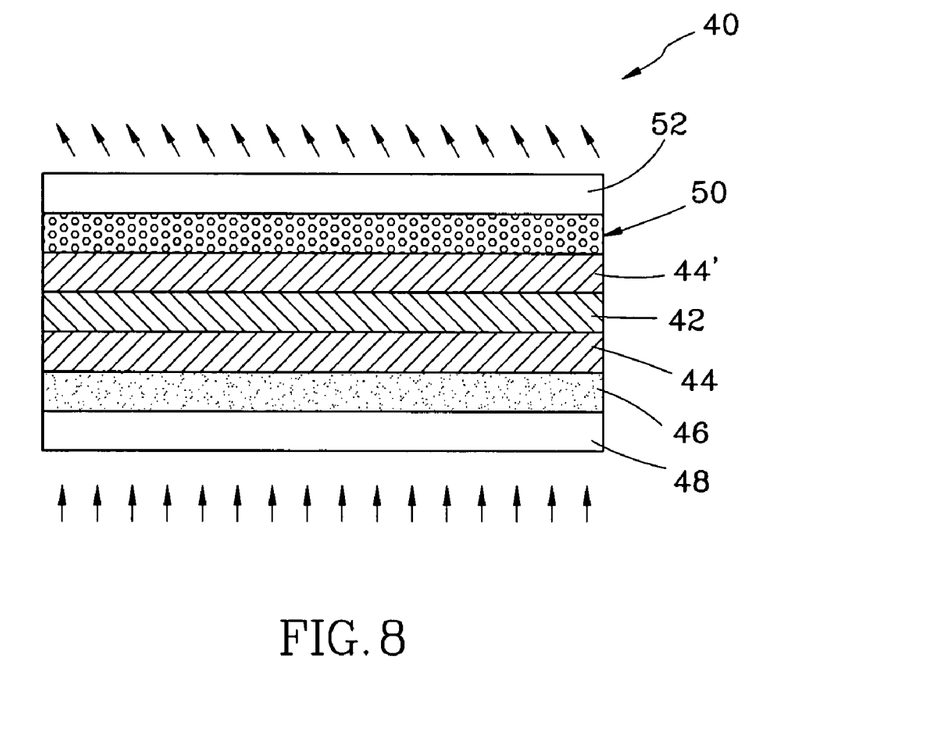
FIG. 8 is a sectional view of the polarizing sheet of a second preferred embodiment of the present invention.
Figure 9:
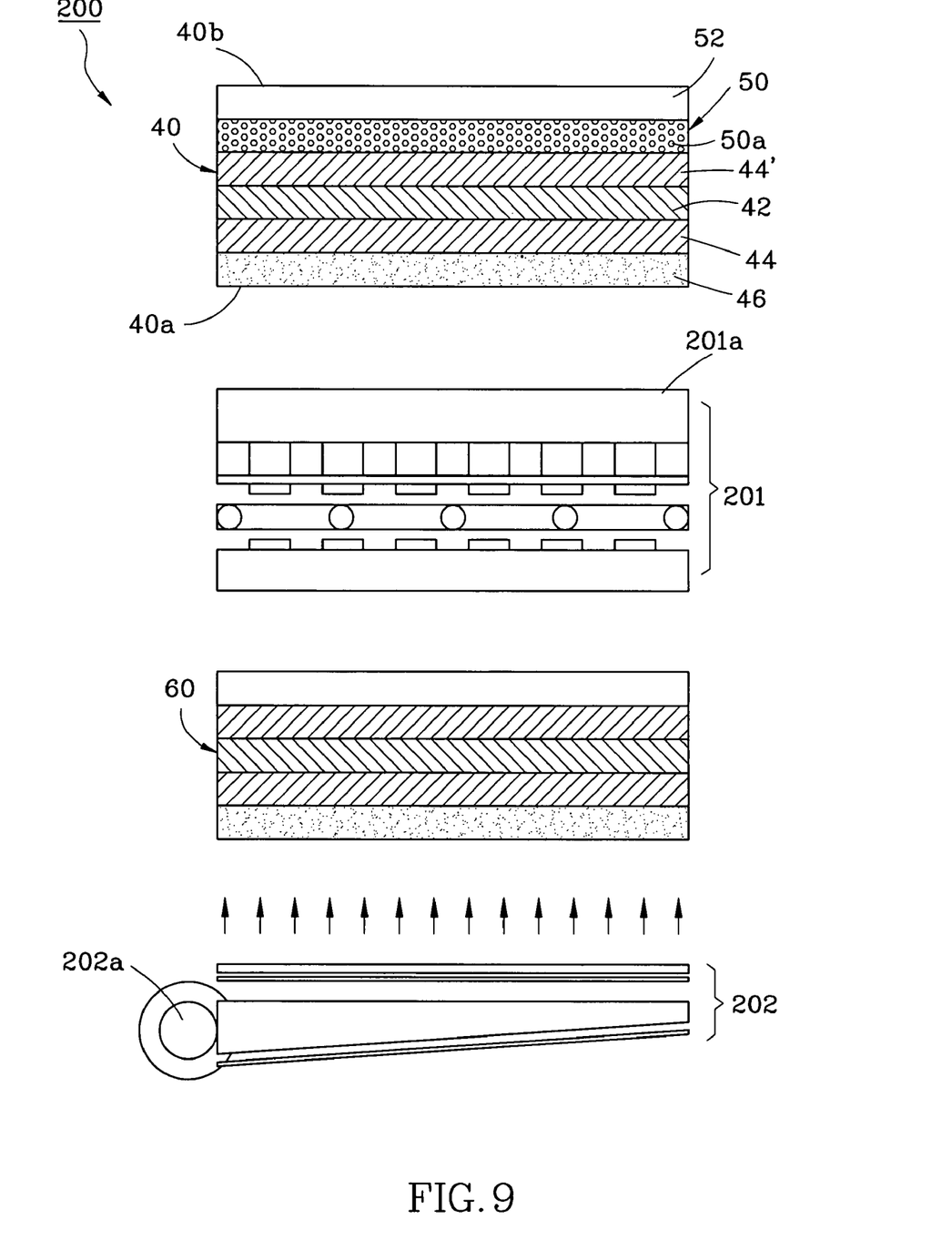
FIG. 9 is a sectional view of a LCD equipped with the polarizing sheet of the second preferred embodiment of the present invention.

FIG. 8 shows a polarizing sheet 40 of the second preferred embodiment of the present invention, and FIG. 9 shows the polarizing sheet 40 (upper polarizing sheet) is mounted above a liquid crystal panel 201 of a LCD 200. A conventional polarizing sheet 60 is mounted between the liquid crystal panel 201 and a backlight module 202. In other words, the second embodiment provides the polarizing sheet 40 for color conversion. To achieve the objective, the polarizing sheet 40 includes a polarizing base member 42, two protective layers 44, 44', a PSA 46, a release film 48, a conversion layer 50 and a surface protective layer 52. The polarizing sheet 60 doesn't have color conversion function to avoid double absorption of spectrum distribution energy energy.

Figure 10:
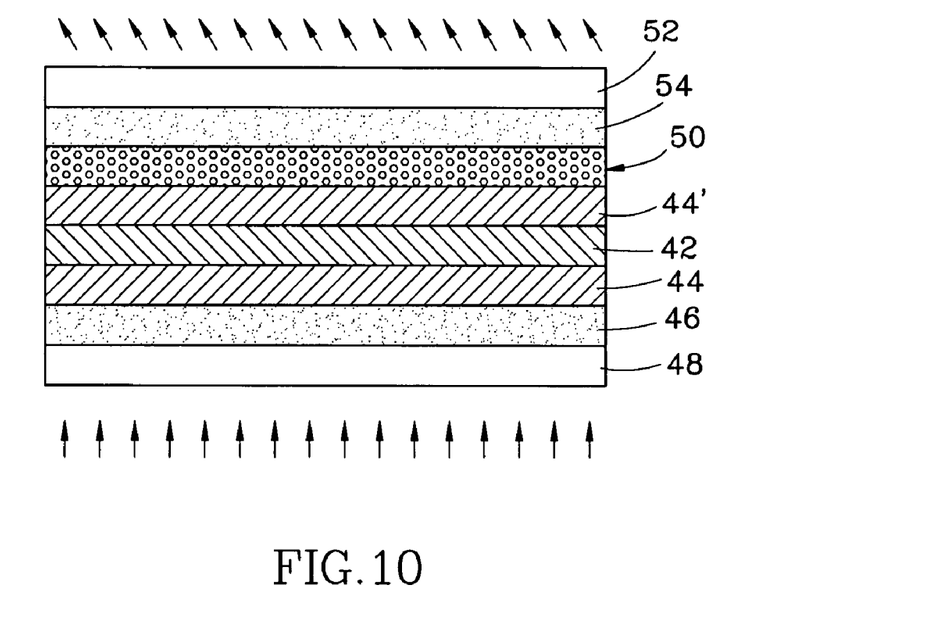
FIG. 10 is similar to FIG. 8, showing PSA between the surface protective layer and the conversion layer.
Figure 11:
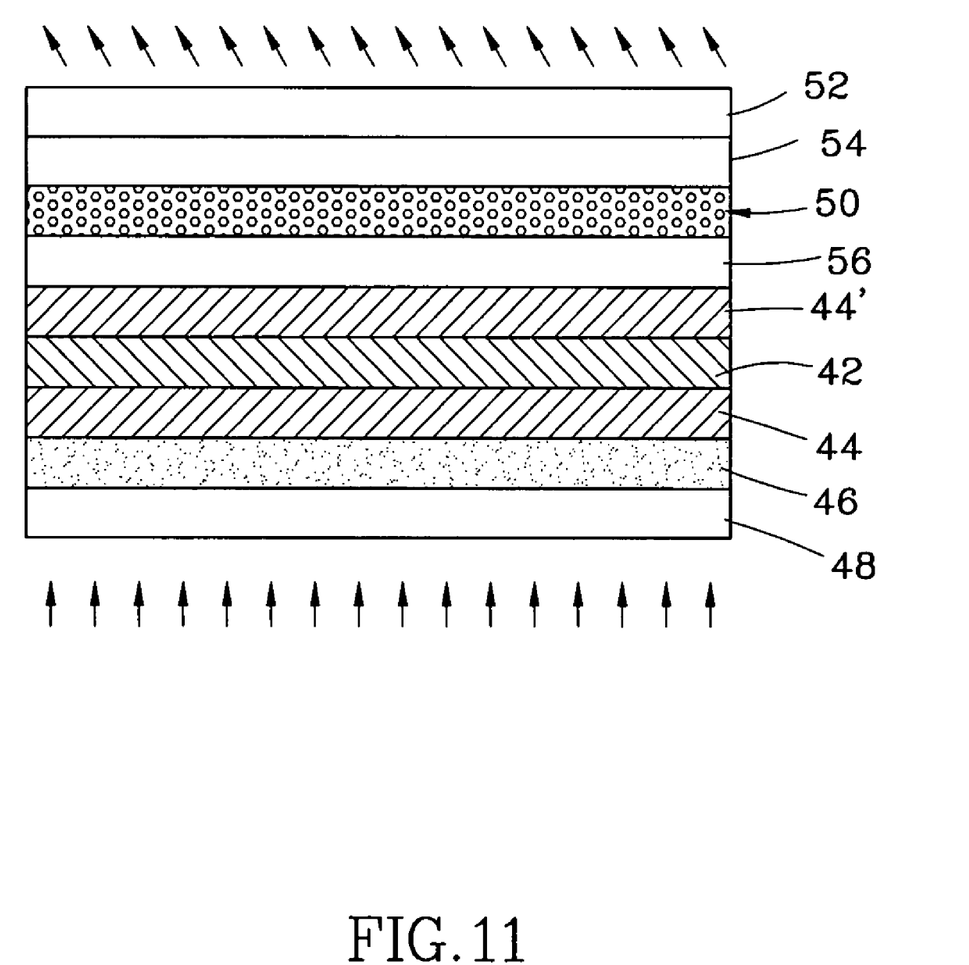
FIG. 11 is similar to FIG. 10, showing the barrier layer between the surface protective layer and the conversion layer.

As shown in FIG. 8, the polarizing sheet 40 has the protective layers 44, 44 on opposite sides of the polarizing base member 42, and the PSA 46 on the protective layer 44 without contacting with the polarizing base member 42. The release film 48 covers the PSA 46 and is peelable, as shown in FIG. 8. After the release film 48 is peeled, the exposed side of the PSA 46 may be attached on an upper substrate 201a of the liquid crystal panel 201. The exposed side of the PSA 46 is a light enter side 40a (second side) of the polarizing sheet 40. The conversion layer 50 is provided on protective layer 44' without contacting with the polarizing base member 42. The surface protective layer 52 is provided to protect the conversion layer 50. An outer side of the surface protective layer 52 is a light output side 40b (first side) of the polarizing sheet 40. The conversion layer has a conversion material 50a, which is made of a material depending on a light source 202a, such as blue light LED, CCFL or UV light LED, of the LCD 200. The materials of the conversion material 50a in accordance with various light sources 202a had been described, so we don't describe again. In addition, diameters of particles of the conversion material 50a are preferred less than 1 μm, and the conversion layer 50 may be added with fewer PSA. FIG. 10 shows the polarizing sheet based on the polarizing sheet of FIG. 8, which is provided with a PSA 54 between the conversion layer 50 and the surface protective layer 52. In addition, the polarizing sheet may be provided with a barrier layer 56 between conversion layer 50 and the protective layer 44'.

The description above is a few preferred embodiments of the present invention and the equivalence of the present invention is still in the scope of the claim of the present invention.

What is claimed is:

1. A polarizing sheet, which has a first side and a second side opposite to the first side, comprising:
   a polarizing base member; and
   a conversion layer between the first side and the polarizing base member, which includes a conversion material to absorb spectrum distribution energy,
   wherein the conversion material of the conversion layer is a light emitting material.

2. The polarizing sheet as defined in claim 1, wherein the first side is a light enter side, and the second side is a light output side.

3. The polarizing sheet as defined in claim 2, wherein the conversion material is made of a material chosen from yttrium aluminum garnet (YAG), terbium aluminum garnet (TAG), sulfide, oxide, halide, borate, borate mixed with fewer metal, halide mixed with fewer metal, YAG mixed with fewer metal, TAG mixed with fewer metal, sulfide mixed with fewer metal, oxide mixed with fewer metal, halide mixed with fewer metal or phosphate mixed with fewer metal, which are inorganic light emitting materials.

4. The polarizing sheet as defined in claim 2, wherein the conversion material of the conversion layer is an organic light emitting material chosen from pigment or dies to absorb visible light spectrum distribution energy.

5. The polarizing sheet as defined in claim 2, wherein the conversion material of the conversion layer is an inorganic light emitting material chosen from sulfide, oxide, halide, phosphate, borate, borate mixed with fewer metal, yttrium aluminum garnet (YAG) mixed with fewer metal, terbium aluminum garnet (TAG) mixed with fewer metal, sulfide mixed with fewer metal, oxide mixed with fewer metal, halide mixed with fewer metal or phosphate mixed with fewer metal to absorb UV light spectrum distribution energy.

6. The polarizing sheet as defined in claim 2, wherein the conversion material of the conversion layer is an organic light emitting material chosen from pigment or dies to absorb UV light spectrum distribution energy.

7. The polarizing sheet as defined in claim 2, wherein diameters of particles of the conversion material of the conversion layer are less than 1 μm.

8. The polarizing sheet as defined in claim 2, further comprising a barrier layer between the polarizing base member and the conversion layer.

9. The polarizing sheet as defined in claim 1, wherein the first side is a light output side, and the second side is a light enter side.

10. The polarizing sheet as defined in claim 9, wherein the conversion material is made of a material chosen from yttrium aluminum garnet (YAG), terbium aluminum garnet (TAG), sulfide, oxide, halide, borate, borate mixed with fewer metal, halide mixed with fewer metal, YAG mixed with fewer metal, TAG mixed with fewer metal, sulfide mixed with fewer metal, oxide mixed with fewer metal, halide mixed with fewer metal or phosphate mixed with fewer metal, which are inorganic light emitting materials.

11. The polarizing sheet as defined in claim 9, wherein the conversion material of the conversion layer is an organic light emitting material chosen from pigment or dies to absorb visible light spectrum distribution energy.

12. The polarizing sheet as defined in claim 9, wherein the conversion material of the conversion layer is an inorganic light emitting material chosen from sulfide, oxide, halide, phosphate, borate, borate mixed with fewer metal, yttrium aluminum garnet (YAG) mixed with fewer metal, terbium aluminum garnet (TAG) mixed with fewer metal, sulfide mixed with fewer metal, oxide mixed with fewer metal, halide mixed with fewer metal or phosphate mixed with fewer metal to absorb UV light spectrum distribution energy.

13. The polarizing sheet as defined in claim 9, wherein the conversion material of the conversion layer is an organic light emitting material chosen from pigment or dies to absorb UV light spectrum distribution energy.

14. The polarizing sheet as defined in claim 9, wherein diameters of particles of the conversion material of the conversion layer are less than 1 μm.

15. The polarizing sheet as defined in claim 9, further comprising a barrier layer between the polarizing base member and the conversion layer.

* * * * *